United States Patent
Son et al.

(10) Patent No.: US 7,127,154 B2
(45) Date of Patent: Oct. 24, 2006

(54) RESERVED PROGRAM RECORD SETTING METHOD AND APPARATUS FOR A PROGRAM PREVIEW

(75) Inventors: Gyu-Yeong Son, Suwon (KR); Jin-Hwi Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 09/210,472

(22) Filed: Dec. 14, 1998

(65) Prior Publication Data

US 2003/0035647 A1 Feb. 20, 2003

(30) Foreign Application Priority Data

Dec. 13, 1997 (KR) .................................. 97-68542

(51) Int. Cl.
H04N 5/91 (2006.01)
H04N 5/445 (2006.01)

(52) U.S. Cl. .......................... 386/83; 725/41

(58) Field of Classification Search .................. 386/1, 386/83; 348/731, 734, 906, 563, 569; 455/181.1, 455/179.1, 180.1, 186.1; 725/39–43, 136, 725/137, 58, 50, 102, 104, 33, 45, 46; H04N 5/44, H04N 5/445, 5/45, 5/50, 5/76, 5/92, 7/083, H04N 7/084, 7/085, 7/086, 7/087
See application file for complete search history.

(56) References Cited

U.S. PATENT DOCUMENTS

| | | | | |
|---|---|---|---|---|
| 5,583,560 A | * | 12/1996 | Florin et al. ................... | 725/40 |
| 5,657,072 A | * | 8/1997 | Aristides et al. ............... | 725/46 |
| 5,850,218 A | * | 12/1998 | LaJoie et al. .................. | 725/45 |
| 6,002,444 A | * | 12/1999 | Marshall et al. ............... | 725/41 |
| 6,091,884 A | * | 7/2000 | Yuen et al. ..................... | 386/83 |
| 6,157,413 A | * | 12/2000 | Hanafee et al. ............. | 348/563 |
| 6,163,345 A | * | 12/2000 | Noguchi et al. ............ | 348/906 |
| 6,239,794 B1 | * | 5/2001 | Yuen et al. .................. | 348/906 |
| 6,263,501 B1 | * | 7/2001 | Schein et al. .................. | 725/39 |
| 6,412,111 B1 | * | 6/2002 | Cato ............................ | 725/58 |
| 6,549,719 B1 | * | 4/2003 | Mankovitz .................... | 386/83 |
| 2002/0012525 A1 | * | 1/2002 | Yuen et al. ..................... | 386/83 |
| 2002/0019981 A1 | * | 2/2002 | Schein et al. .................. | 725/41 |
| 2003/0088873 A1 | * | 5/2003 | McCoy et al. ................ | 725/63 |

* cited by examiner

*Primary Examiner*—Thai Tran
*Assistant Examiner*—Mishawn Dunn
(74) *Attorney, Agent, or Firm*—Staas & Halsey LLP

(57) ABSTRACT

A reserved program record setting method and apparatus for a program preview of a broadcasting program to be recorded and used with a video cassette recorder (VCR) and a television set. The method includes a first step of judging whether a program preview of a broadcasting program to be reserved and recorded is being broadcast, a second step of storing a program reserving code of the broadcasting program when the program preview is currently being broadcast in the reserved program recording mode, and a third step of completing a reserved program recording operation by turning off the VCR, thereby quickly reserving a record for a predetermined program by once pressing a program preview storing key while the program preview of the broadcasting program to be recorded is being broadcast.

70 Claims, 5 Drawing Sheets

RESERVED PROGRAM RECORD SETTING METHOD AND APPARATUS FOR A PROGRAM PREVIEW

CROSS-REFERENCE TO RELATED APPLICATIONS

This application claims the benefit of Korean Application No. 97-68542, filed Dec. 13, 1997, in the Korean Patent Office, the disclosure of which is incorporated herein by reference.

BACKGROUND OF THE INVENTION

1. Field of the Invention

The present invention relates to a reserved program record setting method and apparatus for a program preview (notifying program guide information), and more particularly, to an improved reserved program record setting method and apparatus for a program preview by which a user sets a predetermined program as a reserved program (a program to be reserved for recording) by activating a program preview storing key when a program preview of a regular program to be recorded is broadcast (displayed) and not the program itself being broadcast.

2. Description of the Related Art

Generally, a KBPS (Korea Broadcasting Program Service) code is a broadcasting code which is transmitted from a broadcasting station. Each broadcasting station has its own number and code.

Namely, in the case that a user wishes to watch a predetermined broadcasting program such as a movie, sports program etc., but cannot watch the program due to a predetermined event, the user may use a function for reserving a program record by storing a code of the program using a predetermined code determined for every broadcasting program.

The broadcasting station outputs a program reserving code which corresponds to the amount of one week for a reserved program record function when transmitting a broadcasting signal. Therefore, a user having a KBPS VCR (Video Cassette Tape Recorder) and a television set can reserve a program by selecting the predetermined code for the desired broadcasting program to be recorded in advance by one week.

FIG. 1 illustrates the construction of a conventional apparatus for setting a reserved program record using a VCR and a television set. The conventional apparatus may be in the VCR, the television set or other products in so far as the broadcasting program can be recorded by using a reserving code in these products.

The apparatus for setting a reserved program record includes a tuner 11 receiving a broadcasting signal from a broadcasting station, a key input unit 16 having a reserved program record start key 16a, a controller 12 for selecting a broadcasting frequency of a predetermined program, outputting the selection signal of the selected broadcasting frequency to the tuner 11, selecting KBPS data when a reserved program record start signal is received from a receiver 17 and outputting a control signal indicating reserved time (a preset recording time, that is, the time to be preset by a user indicating when the recording of a broadcasting program will start and end), a memory 13 for transmitting and receiving signals with the controller 12 and storing reserved KBPS data therein, a KBPS decoder 14 for analyzing the KBPS data contained in the broadcasting signal among the signals which may be selected and transferring the analyzed KBPS signal to the controller 12, and a recording unit 15 for recording the decoded broadcasting signal into a recording medium in accordance with an instruction from the controller 12.

FIG. 2 is a flow chart illustrating steps of a reserved program record based on the conventional KBPS apparatus shown in FIG. 1. As shown therein, when a user inputs a selection using a reserved program record start key on a VCR remote controller (key input unit 16) in Step S21, broadcasting stations, times, dates, and titles of broadcasting programs are listed on a television screen for as much as one week in the future in Step S22. At this time, a cursor blinks on a title of a program which is currently being broadcast (reviewed by the user) on the screen of the television set in Step S23.

The user moves the cursor to reserved data indicative of reserving data for reserving recording of a broadcasting program a user wants to record, such as recording start and end times, a broadcasting channel, etc. (in Step S24) of the broadcasting program which is selected by the user as a broadcasting program to be recorded, and then moves the cursor to the reserved time (in Step S25) and the title (in Step S26) of the broadcasting program selected by the user to be reserved.

The user verifies whether or not the selected program is a desired broadcasting program in Step S27, and if the selected program is a desired broadcasting program to be recorded, the program reserving code is stored using the reserved program record start key 16a in Step S28. The VCR power is turned off in Step S29 and the reserved program record is completed in Step S30.

However, in the conventional KBPS reserved program record method, when the user wishes to reserve a predetermined broadcasting program, the user must repeatedly move the cursor, so that much effort is required for reserving the desired broadcasting program, and the procedure for reserving the broadcasting program is complicated.

In particular, over a weekend, there may be a number of broadcasting programs to reserve for predetermined times, so that the time required for moving the cursor to reserve these broadcasting programs is increased.

SUMMARY OF THE INVENTION

Accordingly, it is an object of the present invention to provide a reserved program record setting method for a program preview which overcomes the aforementioned problems encountered in the conventional art.

It is another object of the present invention to provide a reserved program record setting method for easily setting the reservation for recording of a broadcasting program by using a preview of the broadcasting program.

It is still another object of the present invention to provide a reserved program record setting method for a program preview which is capable of more quickly reserving for recording a broadcasting program to be recorded by once pressing a program preview storing key while a program preview of the broadcasting program desired to be recorded is being broadcast.

In order to achieve the above objects, there is provided a reserved program record setting method for a program preview using a VCR and a television set, which includes a first step of judging whether a program preview of a broadcasting program to be reserved and recorded is being broadcast, a second step of storing the program preview when the program preview is being broadcast in a reserved program record mode, and a third step of completing a reserved program recording operation by turning off the VCR.

Additional advantages, objects and other features of the invention will be set forth in part in the description which follows and, in part, will become apparent to those having ordinary skill in the art upon examination of the following or may be learned from practice of the invention. The objects and advantages of the invention may be realized and attained as particularly pointed out in the appended claims as a result of the experiment compared to the conventional art.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The operational principle according to the present invention will be explained with reference to the accompanying FIGS. 3 through 4B.

Figure 1:
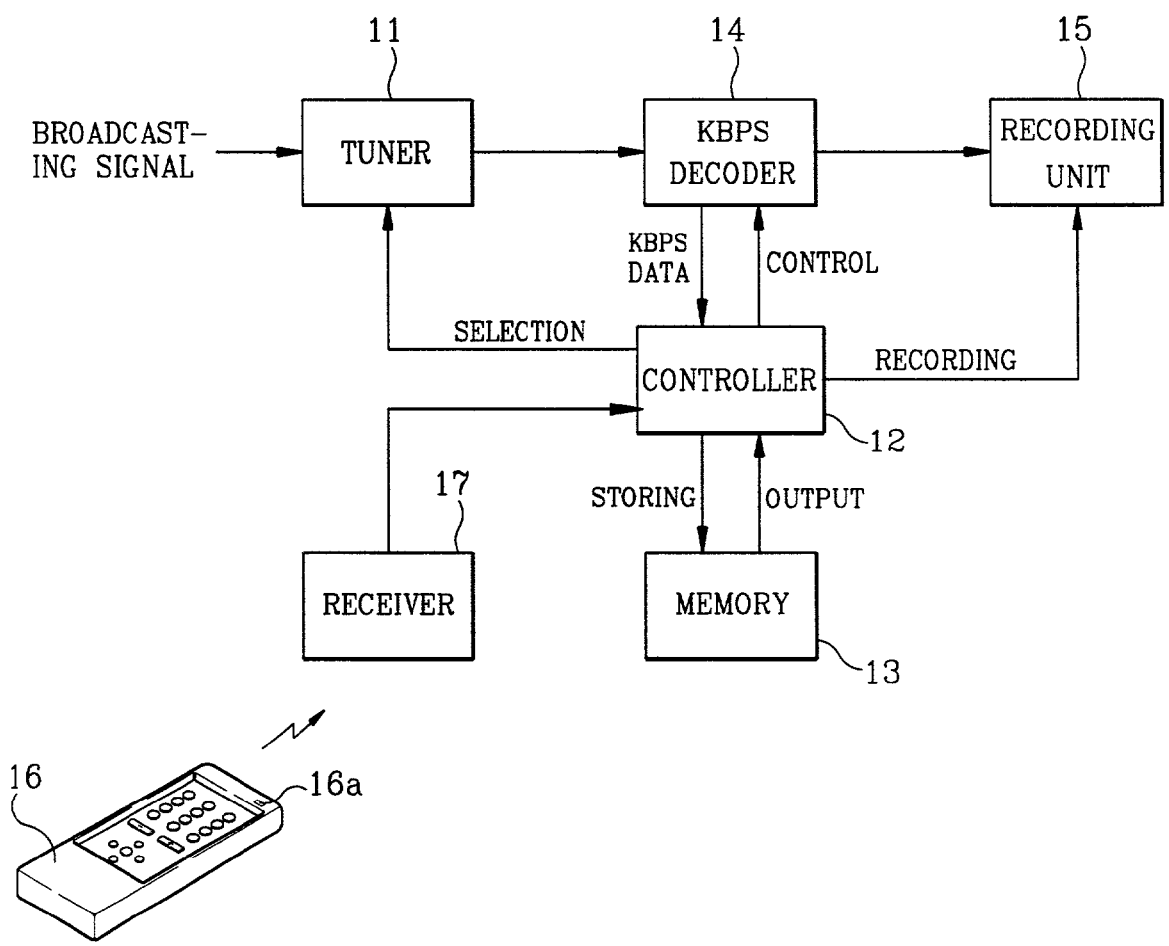
FIG. 1 is a block diagram illustrating a conventional reserved program record setting apparatus.
Figure 2:
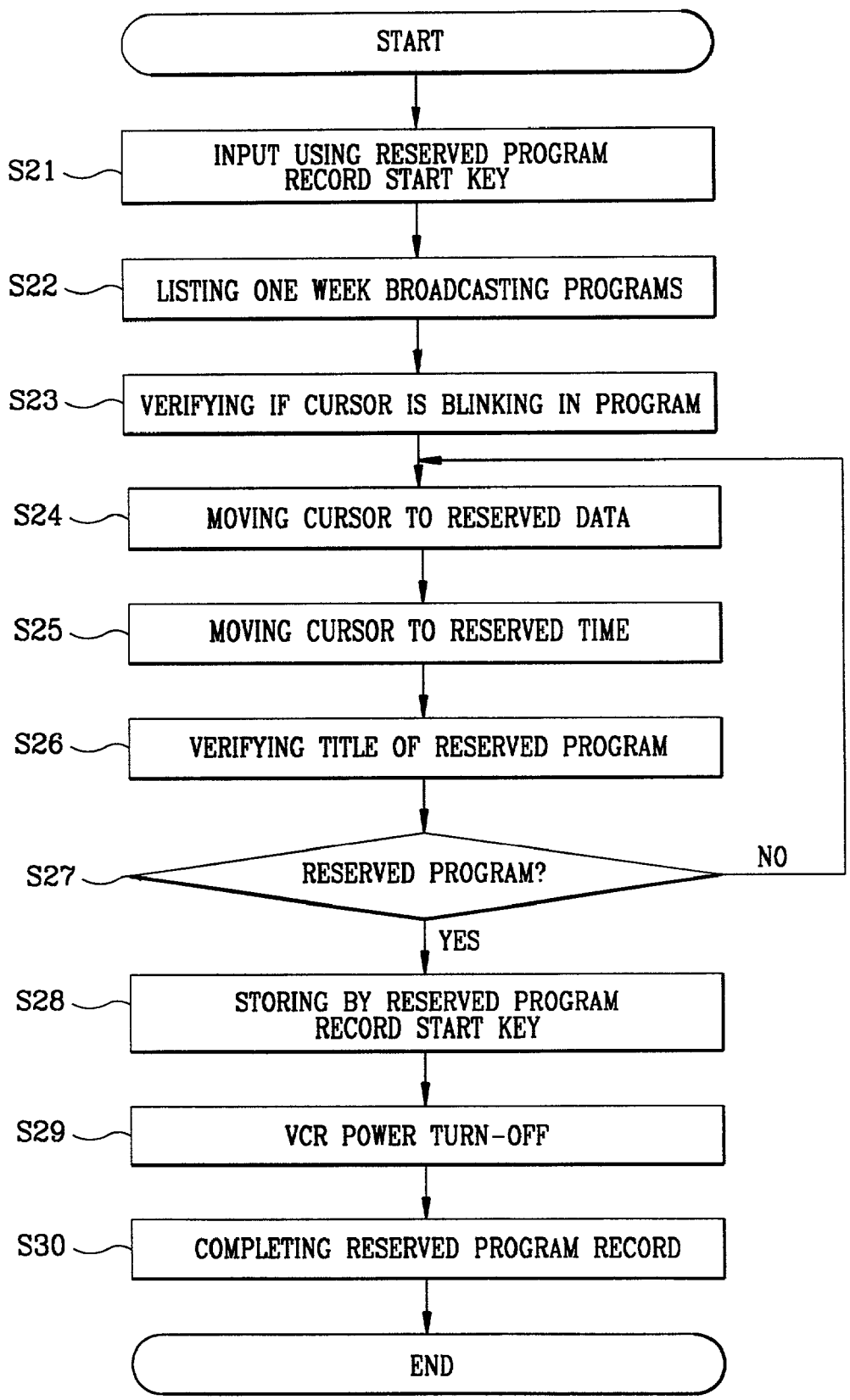
FIG. 2 is a flow chart illustrating a conventional reserved program record setting method.
Figure 3:
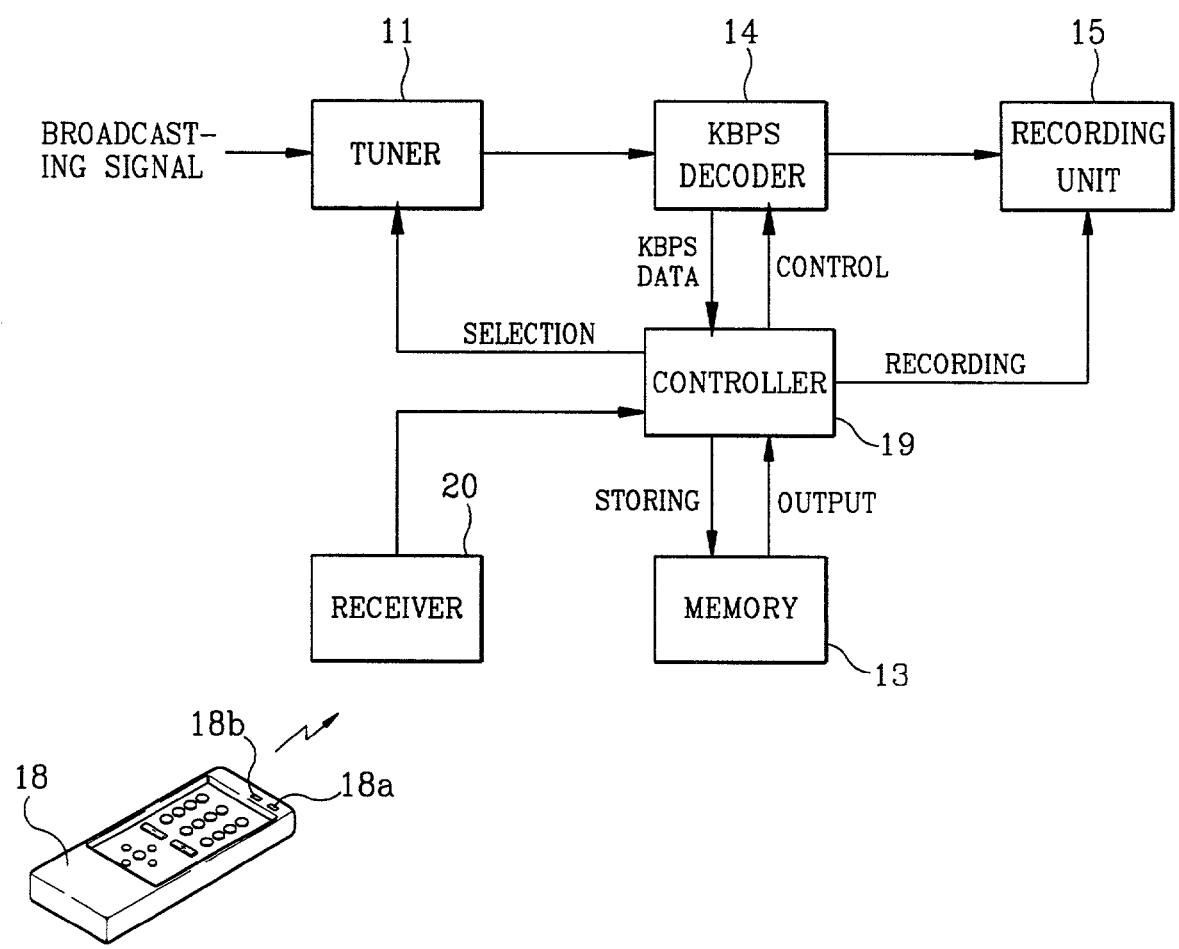
FIG. 3 is a block diagram illustrating a reserved program record setting apparatus using a program preview of a broadcasting program to be reserved and recorded according to an embodiment of the present invention.

FIG. 3 is a block diagram illustrating a reserved program record setting apparatus using a program preview according to an embodiment of the present invention. The reserved program record setting apparatus may be in a VCR, television set, or other products in so far as the broadcasting program can be recorded by using a reserving code in these products. As shown therein, the reserved program record setting apparatus using a program preview according to the embodiment of the present invention includes a tuner 11 receiving a broadcasting signal from a broadcasting station, a key input unit 18 having a reserved program record start key 18a and a program preview storing key 18b, a receiver 20 for receiving a reserved program record start signal or a program preview storing signal according to a user activating the reserved program record start key 18a or the program preview storing key 18b, respectively, a controller 19 for selecting a broadcasting frequency, outputting a selection signal indicative of the selected broadcasting frequency and program preview of KBPS data such as a KBPS program reserving code when the program preview storing signal is received from the receiver 20 and outputting a control signal which indicates the reserved program record start when the reserved program record start signal is received from the receiver 20, a memory 13 for transmitting and receiving signals with the controller 19 and storing the KBPS program reserving codes, a KBPS decoder 14 for analyzing the KBPS data contained in the broadcasting signal among the selected broadcasting signals and transferring the analyzed KBPS data to the controller 19, and a recording unit 15 for recording the decoded broadcasting signal into a recording medium in accordance with a recording instruction from the controller 19. The broadcasting signal includes electronic program guide (EPG) data which has the program previews and the KBPS program reserving codes indicative of recording start and end times, broadcasting channel, etc., of the broadcasting channel corresponding to the program preview.

Figure 4A:
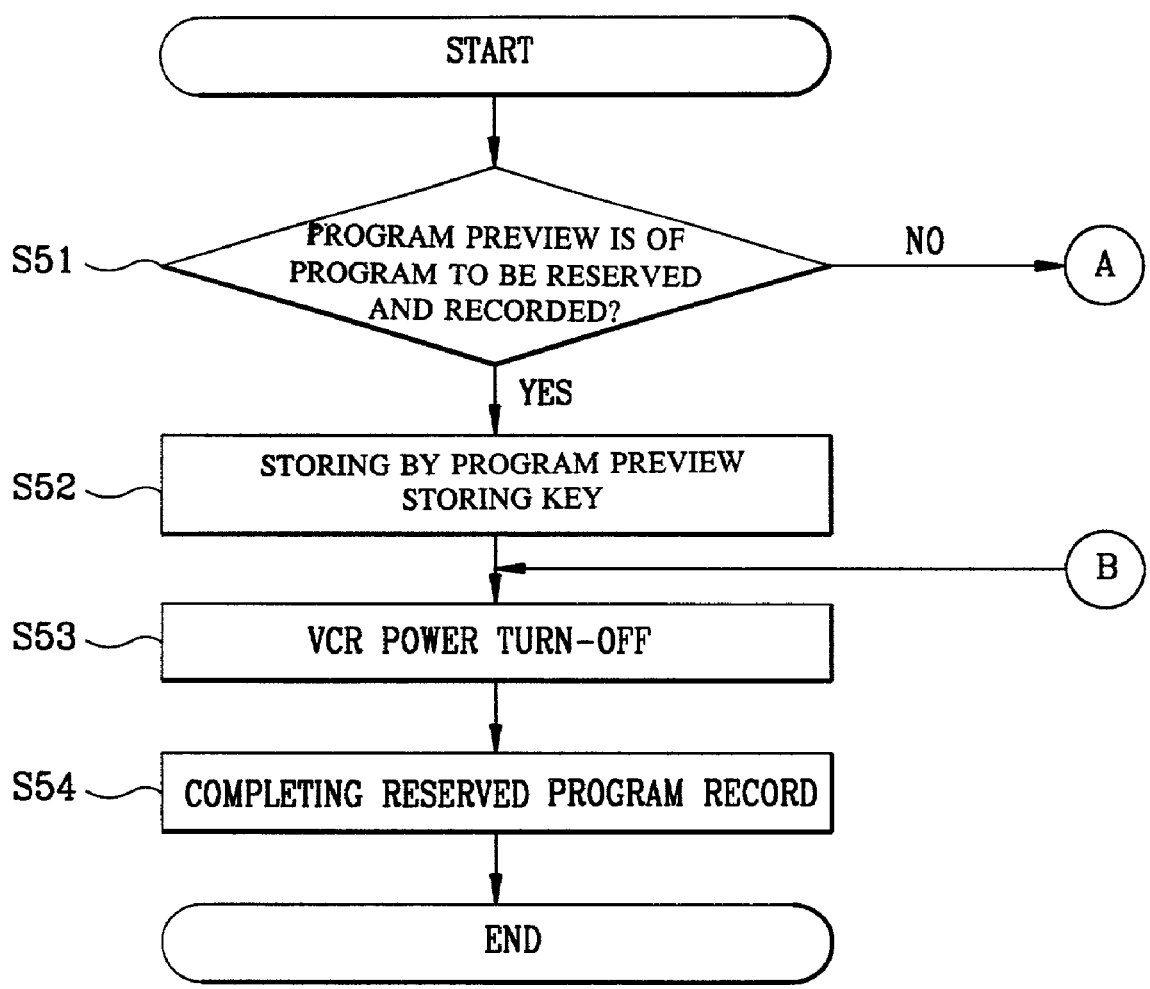
FIGS. 4A and 4B are flow charts illustrating a reserved program record setting method using program preview of the broadcasting program to be reserved and recorded according to the embodiment of the present invention.
Figure 4B:
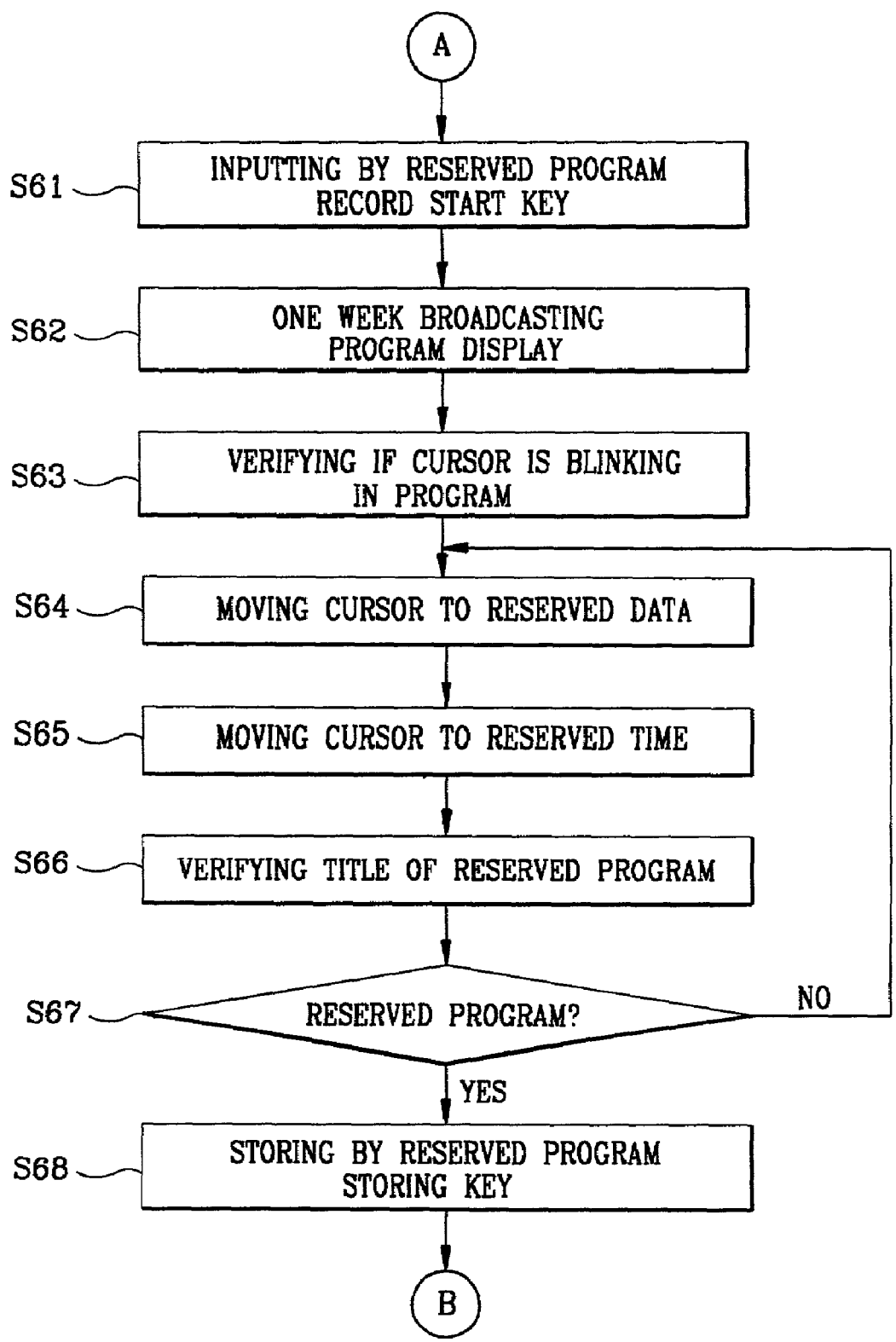

FIGS. 4A and 4B are flow charts illustrating a reserved program record setting method using a program preview according to the embodiment of the present invention. The operation of the reserved program record setting apparatus using the program preview according to the embodiment of the present invention will be explained with reference to these drawings.

First, when a broadcasting signal is input through an antenna (not shown) of a television set, the received broadcasting signal is tuned by the tuner 11, and the KBPS data contained in the tuned broadcasting signal is analyzed by the KBPS decoder 14 and is transferred to the controller 19.

When the broadcasting station transmits KBPS program reserving codes of the KBPS data for a program reserving function, the transmission is implemented assuming that the KBPS program reserving codes are transmitted.

The KBPS program reserving code input into the controller 19 is stored into the memory 13 and may be displayed on the screen of the television set (not shown) in accordance with a key input signal of a user.

First, the user judges whether the program preview of the broadcasting program to be reserved and recorded is broadcast (currently being displayed on the screen of the television set) or the program preview has ended while the user is watching a program received by the tuner 11 in Step S51.

When the program preview is being broadcast, the user directly presses the program preview storing key 18b disposed on the key input unit 18 (which may be a VCR remote controller) and stores the KBPS program reserving code, for the program preview corresponding to the broadcasting program to be reserved and recorded, into the memory 13 in Step S52.

Therefore, when the broadcasting program of the program preview is broadcast, the recording unit 15 records the broadcasting program according to the KBPS program reserving code stored at the time of viewing the program preview of the broadcasting program.

The user finishes a reserved program record operation by turning off the VCR in Step S53.

Then, the reserved program record is completed in Step S54.

However, if the program preview of the broadcasting program to be recorded is broadcast, the KBPS program reserving code of the broadcasting program to be recorded can be directly stored using the program preview storing key 18b.

If the program preview is changed to another program preview before the KBPS program reserving code is stored using the program preview storing key 18b while watching the currently displayed program preview, or the program preview has ended, the user may reserve the broadcasting program to be recorded according to the conventional method by pressing the reserved program record start key 18a. FIG. 4B shows the steps as to how the user reserves the broadcasting program according to the conventional method. Steps S61 through S68 are the same as Steps S21 through S28, shown in FIG. 4B, respectively, and thus a detailed description of Steps S61 through S68 is omitted. After Step S68 is completed, the process returns to Step S53 to await the turning off of the VCR power.

Namely, since the user may use the program preview storing key 18b and the reserved program record start key 18a, it is possible to reserve a predetermined program at any time.

In addition, the KBPS program reserving code of the regular broadcasting program to be recorded is stored into the memory 13 and then the reserved program record is completed only when the power of the VCR is turned off (see Step S54).

Therefore, when the reserved program record is completed, if the data and time are matched, the recording unit 15 is automatically operated to record a predetermined reserved program in accordance with an instruction of the controller 19.

As described above, in the reserved program record setting method using a program preview according to the present invention, it is possible to automatically record a predetermined broadcasting program to be broadcast in the future by reserving the broadcasting program using the program preview storing key during the broadcasting (displaying) of the program preview compared to the conventional art in which the reserved broadcasting program is recorded by using the input key and cursor several times to indicate a plurality of items of information about the broadcasting program, so that it is possible to quickly and easily implement a reserved program recording operation.

The foregoing description relates to KBPS data transmission, but the present invention is applicable to any standard utilizing similar principles.

Although the preferred embodiment of the present invention has been disclosed for illustrative purposes, those skilled in the art will appreciate that various modifications, additions and substitutions are possible, without departing from the scope and spirit of the inventions recited in the accompanying claims.

What is claimed is:

1. A method of reserved recording of an upcoming program while a program preview for the upcoming program is being broadcast, the method comprising:
   receiving program guide information associated with the upcoming program;
   receiving, during the broadcast of the program preview, a user command to reserve the upcoming program for future recording; and
   reserving, in response to the user command, the upcoming program for future recording using the received program guide information,
   wherein said reserving the upcoming program is only operable while the program preview is being displayed.

2. The method of reserved recording in accordance with claim 1, wherein the program guide information is embedded in the program preview.

3. The method of reserved recording in accordance with claim 1, wherein the program preview comprises audio and video data in addition to the program guide information.

4. The method of reserved recording in accordance with claim 1, wherein said receiving the program guide information comprises automatically receiving the program guide information for the upcoming program to be broadcast at the future time without another user command requesting the program guide information.

5. The method of reserved recording in accordance with claim 1, further comprising prompting a user for the user command to reserve the upcoming program for future recording during the broadcast of the program preview.

6. The method of reserved recording in accordance with claim 1, further comprising providing a user input interface having user selection keys, wherein the user command is generated in response to only one of the user selection keys being depressed.

7. The method of reserved recording in accordance with claim 1, wherein the user command is generated in response to a single action of a user.

8. The method of reserved recording in accordance with claim 1, further comprising, if the user command is not received during the broadcast of the program preview:
   receiving another user command to display program information not received during the broadcast of the program preview; and
   reserving the upcoming program using the displayed program information.

9. The method of reserved recording in accordance with claim 1, wherein said reserving the upcoming program comprises reserving the upcoming program without retrieving stored program guide information from a memory.

10. The method of reserved recording in accordance with claim 9, wherein the program guide information is embedded in the program preview.

11. The method of reserved recording in accordance with claim 9, wherein the program preview comprises audio and video data in addition to the program guide information.

12. The method of reserved recording in accordance with claim 9, wherein said receiving the program guide information comprises automatically receiving the program guide information for the upcoming program to be broadcast at the future time without another user command requesting the program guide information.

13. The method of reserved recording in accordance with claim 9, wherein said reserving the upcoming program comprises reserving the upcoming program without retrieving stored program guide information from a memory.

14. The method of reserved recording in accordance with claim 9, further comprising prompting a user for the user command to reserve the upcoming program for future recording during the broadcast of the program preview.

15. The method of reserved recording in accordance with claim 9, further comprising providing a user input interface having user selection keys, wherein the user command is generated in response to only one of the user selection keys being depressed.

16. The method of reserved recording in accordance with claim 9, wherein the user command is generated in response to a single action of a user.

17. A program recording device for reserved recording of an upcoming program while a program preview for the upcoming program is being broadcast, the device comprising:
   a memory to store program guide information associated with the upcoming program;
   a user interface to receive, during the broadcast of the program preview, a user command to reserve the upcoming program for future recording; and
   a controller to reserve the upcoming program for future recording using the program guide information,
   wherein the program guide information is not stored in said memory until the user command is received, and the controller is not operable to reserve the upcoming program unless the user command is received during the broadcast of the program guide information.

18. The program recording device according to claim 17, wherein the program guide information is embedded in the program preview.

19. The program recording device according to claim 17, wherein the program preview comprises audio and video data in addition to the program guide information.

20. The program recording device according to claim 17, wherein the program guide information for the upcoming program to be broadcast at the future time is automatically received without another user command requesting the program guide information.

21. The program recording device according to claim 17, wherein said controller further prompts a user for the user command during the broadcast of the program preview.

22. The program recording device according to claim 17, further comprising a user input interface having user selection keys, wherein the user command is generated in response to only one of the user selection keys being depressed.

23. The program recording device according to claim 17, wherein the user command is generated in response to a single action of a user.

24. The program recording device of claim 17, further comprising a recording unit that is operable to record the upcoming program in accordance with the program guide information stored in said memory.

25. The program recording device of claim 24, wherein said recording unit comprises a video cassette recorder.

26. The program recording device of claim 24, wherein said recording unit comprises a television having a recording unit.

27. The program recording device of claim 24, wherein said recording unit comprises a Hard Disc drive.

28. The program recording device according to claim 17, further comprising a receiver to receive the program guide information.

29. The program recording device according to claim 28, wherein the program guide information is not stored as it is received by said receiver unless in response to the user command to reserve the upcoming program for future recording.

30. The program recording device according to claim 29, wherein the program guide information is embedded in the program preview.

31. The program recording device according to claim 29, wherein the program preview comprises audio and video data in addition to the program guide information.

32. The program recording device according to claim 29, wherein the program guide information for the upcoming program to be broadcast at the future time is automatically received without another user command requesting the program guide information.

33. The program recording device according to claim 29, wherein said controller further prompts a user for the user command during the broadcast of the program preview.

34. The program recording device according to claim 29, further comprising a user input interface having user selection keys, wherein the user command is generated in response to only one of the user selection keys being depressed.

35. The program recording device according to claim 29, wherein the user command is generated in response to a single action of a user.

36. The program recording device of claim 29, further comprising a recording unit that is operable to record the upcoming program in accordance with the program guide information stored in said memory.

37. The program recording device according to claim 29, further comprising a receiver to receive the program guide information.

38. The program recording device according to claim 37, wherein the program guide information is not displayed as it is received by said receiver while the user command to reserve the upcoming program for future recording is received.

39. A computer readable storage medium encoded with a computer program to implement a method of reserved recording of the upcoming program while a program preview for an upcoming program is being broadcast, the method comprising:
    receiving program guide information associated with the upcoming program;
    receiving, during the broadcast of the program preview, a user command to reserve the upcoming program for future recording; and
    reserving, in response to the user command, the upcoming program for future recording using the received program guide information,
    wherein said reserving the upcoming program is only operable while the program preview is being broadcast.

40. The computer readable storage medium according to claim 19, wherein the program guide information is embedded in the program preview.

41. The computer readable storage medium according to claim 19, wherein the method further comprises prompting a user for the user command during the broadcast of the program preview.

42. The computer readable storage medium according to claim 19, wherein
    said receiving the user command comprises detecting an input from a user input interface having user selection keys, and
    the user command is generated in response to only one of the user selection keys being depressed.

43. The computer readable storage medium according to claim 19, wherein the program preview comprises audio and video data in addition to the program guide information.

44. The computer readable storage medium according to claim 39, wherein said receiving the program guide information comprises automatically receiving the program guide information for the program to be broadcast at the future time without another user command requesting the program guide information.

45. The computer readable storage medium of claim 39, wherein the method further comprises, if the user command is not received during the broadcast of the program preview:
    receiving another user command to display program information not received during the broadcast of the program preview; and
    alternately reserving the upcoming program using the displayed program information.

46. The computer readable storage medium in accordance with claim 39, wherein the user command is generated in response to a single action of a user.

47. The computer readable storage medium in accordance with claim 46, the method further comprising recording the upcoming program in accordance with the program guide information.

48. The computer readable storage medium in accordance with claim 39, wherein said reserving the upcoming program comprises reserving the upcoming program without retrieving stored program guide information from a memory.

49. The computer readable storage medium according to claim 48, wherein the program guide information is embedded in the program preview.

50. The computer readable storage medium according to claim 48, wherein the method further comprises prompting a user for the user command during the broadcast of the program preview.

51. The computer readable storage medium according to claim 48, wherein
    said receiving the user command comprises detecting an input from a user input interface having user selection keys, and the user command is generated in response to only one of the user selection keys being depressed.

52. The computer readable storage medium according to claim 48, wherein the program preview comprises audio and video data in addition to the program guide information.

53. The computer readable storage medium according to claim 48, wherein said receiving the program guide information comprises automatically receiving the program guide information for the program to be broadcast at the future time without another user command requesting the program guide information.

54. The computer readable storage medium in accordance with claim 48, wherein said reserving the upcoming program comprises reserving the upcoming program without retrieving stored program guide information from a memory.

55. The computer readable storage medium in accordance with claim 48, wherein the user command is generated in response to a single action of a user.

56. The computer readable storage medium in accordance with claim 48, the method further comprising recording the upcoming program in accordance with the program guide information.

57. A method of reserved recording of an upcoming program while a program preview for the upcoming program is being broadcast, the method comprising:
receiving the program preview including program guide information associated with the upcoming program;
displaying the program preview;
receiving, during said displaying the program preview, a user command to reserve the upcoming program for future recording while the program guide information is being received; and
reserving, in response to the user command, the upcoming program for future recording using the received program guide information without the program guide information being displayed.

58. The method of reserved recording in accordance with claim 57, wherein the user command is generated in response to a single action of a user.

59. The method of reserved recording in accordance with claim 57, wherein the received program guide information is not stored unless the user command is received.

60. The method of reserved recording in accordance with claim 57, further comprising, if the user command is not received during the display of the program preview:
receiving another user command to display program information not received during the broadcast of the program preview; and
alternately reserving the upcoming program using the displayed program information.

61. The method of reserved recording in accordance with claim 57, further comprising:
receiving a plurality of program previews for a plurality of upcoming programs; and
storing the plurality of program previews;
wherein said displaying the program preview comprises sequentially replaying the stored plurality of program previews.

62. The method of reserved recording in accordance with claim 61, further comprising providing a user input interface having user selection keys, wherein the user command is generated in accordance with a single one of the user selection keys being depressed.

63. A method of reserved recording of an upcoming program while a program preview for the upcoming program is being broadcast, the method comprising:
receiving program guide information associated with the upcoming program;
using a user input interface having user selection keys to generate a user command to reserve the upcoming program for future recording in accordance with a single action of one of the user selection keys being depressed to select and reserve the upcoming program; and
reserving, in response to the user command, the upcoming program for future recording using the received program guide information.

64. The method of reserved recording in accordance with claim 63, wherein the user command is generated in response to the single action of a user while the program guide information is not displayed.

65. The method of reserved recording in accordance with claim 63, wherein the received program guide information is not stored unless the user command is received.

66. A computer readable storage medium encoded with a computer program to implement a method of reserved recording of the upcoming program while a program preview for the upcoming program is being broadcast, the method comprising:
receiving program guide information associated with the upcoming program;
receiving a user command from a user input interface having user selection keys, where the user input interface generates, during the broadcast of the program preview, the user command to reserve the upcoming program for future recording in accordance with a single action of one of the user selection keys being depressed to select and reserve the upcoming program; and
reserving, in response to the user command, the upcoming program for future recording using the received program guide information.

67. The computer readable medium in accordance with claim 66, wherein the user command is generated in response to the single action of a user while the program guide information is not displayed.

68. The computer readable medium in accordance with claim 66, wherein the received program guide information is not stored unless the user command is received.

69. A method of reserved recording of an upcoming program while a program preview for the upcoming program is being broadcast, the method comprising:
receiving program guide information associated with the upcoming program, the program guide information being included with the program preview;
receiving, during the broadcast of the program preview, a user command to reserve the upcoming program for future recording; and
reserving, in response to the user command, the upcoming program for future recording using the received program guide information,
wherein said reserving the upcoming program is only operable while the program preview is being broadcast.

70. The method of reserved recording in accordance with claim 69, further comprising, if the user command is not received during the broadcast of the program preview:
receiving another user command to display program information not received during the broadcast of the program preview; and
alternately reserving the upcoming program using the displayed program information.

* * * * *